(12) United States Patent
Behrenberg et al.

(10) Patent No.: US 10,990,809 B2
(45) Date of Patent: Apr. 27, 2021

(54) COMPUTER-IMPLEMENTED METHOD AND PROGRAM PRODUCT FOR OBJECT IDENTIFICATION FROM IMAGE DATA

(71) Applicant: IDEMIA Identity & Security Germany AG, Bochum (DE)

(72) Inventors: Christian Behrenberg, Essen (DE); Stefan Fuhrmann, Witten (DE); Maximilian Krueger, Bochum (DE); Stefan Schlenger, Bochum (DE); Martin Werner, Hemer (DE); Christian Winter, Rheda-Wiedenbrück (DE); Marco Wörmann, Dortmund (DE); Ran Zhou, Hattingen (DE)

(73) Assignee: IDEMIA Identity & Security Germany AG, Bochum (DE)

(*) Notice: Subject to any disclaimer, the term of this patent is extended or adjusted under 35 U.S.C. 154(b) by 108 days.

(21) Appl. No.: 16/402,190

(22) Filed: May 2, 2019

(65) Prior Publication Data
US 2019/0340424 A1 Nov. 7, 2019

(30) Foreign Application Priority Data
May 2, 2018 (EP) .................................... 18170307

(51) Int. Cl.
*G06T 7/70* (2017.01)
*G06K 9/00* (2006.01)

(52) U.S. Cl.
CPC ...... *G06K 9/00288* (2013.01); *G06K 9/00711* (2013.01); *G06K 9/00771* (2013.01); *G06T 7/70* (2017.01); *G06T 2207/30201* (2013.01)

(58) Field of Classification Search
None
See application file for complete search history.

(56) References Cited

U.S. PATENT DOCUMENTS

| 7,113,641 | B1 | 9/2006 | Eckes et al. |
| 2006/0251292 | A1 | 11/2006 | Gokturk et al. |
| 2013/0039547 | A1 | 2/2013 | Liu et al. |
| 2015/0248651 | A1* | 9/2015 | Akutagawa ............ G06Q 50/01 705/7.19 |
| 2017/0124385 | A1 | 5/2017 | Ganong et al. |
| 2019/0172243 | A1* | 6/2019 | Mishra .................. G10L 15/063 |
| 2019/0251571 | A1* | 8/2019 | O'Reilly .......... G06Q 20/40145 |
| 2020/0350057 | A1* | 11/2020 | el Kaliouby ....... G06K 9/00248 |

OTHER PUBLICATIONS

European Search Report issued for corresponding European Patent Application No. EP18170307.5 dated Oct. 23, 2018.

* cited by examiner

*Primary Examiner* — Idowu O Osifade
(74) *Attorney, Agent, or Firm* — Moore & Van Allen PLLC; Henry B. Ward, III

(57) ABSTRACT

The present invention relates to a computer-implemented method of identifying a physical object, comprising the steps of providing image data comprising an image object representing a physical object, analyzing the image data to extract identification data for the image object, providing supplementary data associated with a particular physical object, and determining whether the image object corresponds to the particular physical object based on the identification data and supplementary data.

18 Claims, 2 Drawing Sheets

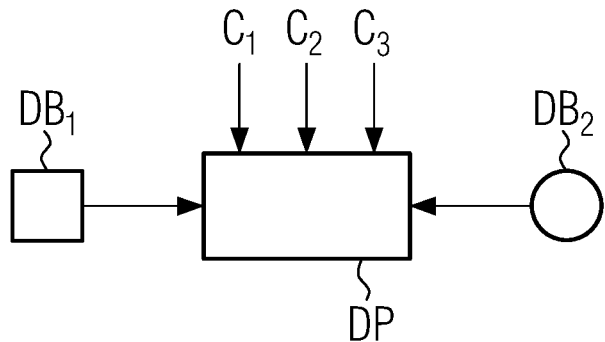
FIG. 2
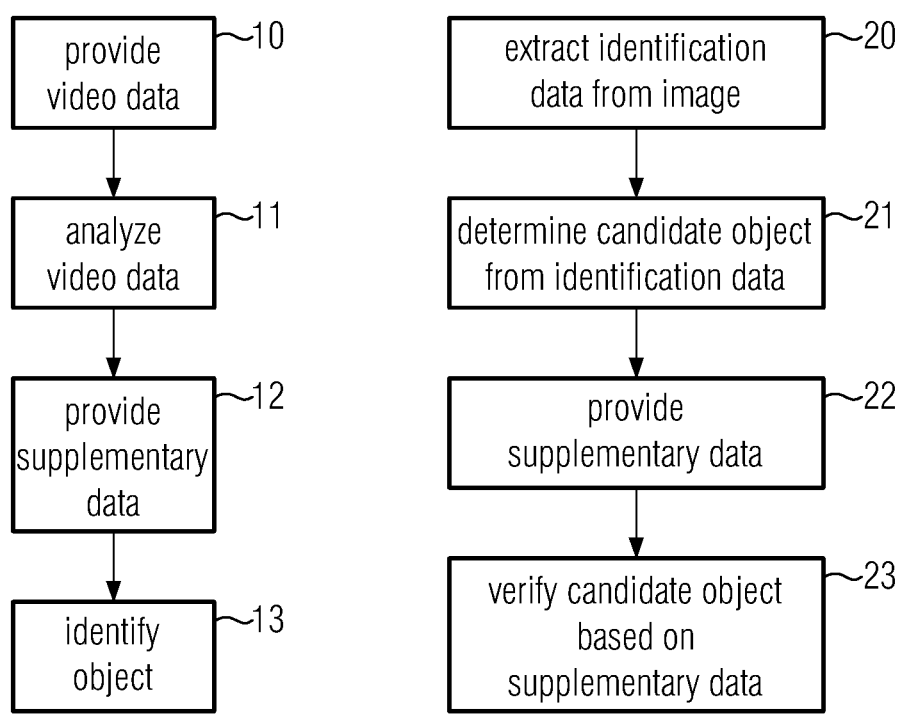
FIG. 3
FIG. 4

COMPUTER-IMPLEMENTED METHOD AND PROGRAM PRODUCT FOR OBJECT IDENTIFICATION FROM IMAGE DATA

FIELD OF THE INVENTION

The invention refers to the identification of an object represented in image data and, in particular, an object shown in one or more video frames. Particularly, the invention refers to the identification of a person.

PRIOR ART

Automatic identification of an object in digital image or video data is becoming an issue of growing importance, for example, in the context of public safety issues. Video analysis has become a significant forensic resource for investigation processes related to crimes and during court proceedings. Analysts and investigators involved with using these video data as an investigative resources face an enormous workload. An existing software platform offers an easy and efficient user interface built on a set of video analytics. The purpose of this platform is to process and analyze large quantities of video data. The embedded algorithms process video sequences by detecting, recording, and classifying the depicted elements of interest. As the software sorts through volumes of raw data, the video analyst can start a review based on the most relevant data, saving the time and effort normally spent watching the entire video.

During the last years, the procedure of face recognition, i.e., identification of a subject based on recognition of its face, has been improved considerably. Face recognition methods may be based on so-called jets that are extracted from a digitized image with Gabor filters of different magnitudes and orientations, said jets being arranged at the nodes of a grid which is adapted to be subjected to displacement, scaling and deformation. This graph, i.e. the structure of the grid and the jets associated with the nodes of the grid, are compared with a reference graph comprising the structure to be recognized.

For this purpose, the optimum form of the grid is determined by a two-phase optimization of a graph comparison function. In the first phase, the size and the position of the graph are optimized simultaneously; in the second phase, the intrinsic form of the graph is optimized. Mallat filter functions may be used instead of Gabor filter functions.

In U.S. Pat. No. 7,113,641, for example, a method of face recognition is disclosed that comprises the steps of providing at least one reference graph comprising digitized reference image data of corresponding reference images, the reference graph or each reference graph comprising a net-like structure, the respective net-like structure being defined in that specific reference image data have assigned thereto nodes which are interconnected by links in a predetermined manner, and jets, each node having a jet assigned thereto and each jet comprising at least one sub-jet which is determined by convolutions of at least one class of filter functions with different magnitudes and/or orientations with the reference image data of the corresponding reference image at the specific node, or by convolutions of at least one class of filter functions with different magnitudes and/or orientations with colour-segmented reference image data of the corresponding reference image at the specific node, or by color information on the reference image data at the specific node, or by texture descriptions of the corresponding reference image at the specific node, said texture descriptions being gained by statistical methods, or by motion vectors at the specific node, said motion vectors being extracted from successive reference images, (b) determining an optimum image graph from the digitized image data for each reference graph, said optimum image graph representing for a specific reference graph the optimum adaptation to said reference graph and being determined by projecting the net-like structure of said specific reference graph into the image data whereby the structure of the image graph is defined, and determining sub-jets of the image graph at the nodes defined by its structure, said sub-jets corresponding to at least part of the determined sub-jets of the specific reference graph, and the projection of the net-like structure of said specific reference graph being varied until a graph comparison function which compares the jets of the image graph with the corresponding jets of said specific reference graph becomes optimal, and (c) associating the structure or each structure with the reference image corresponding to the reference graph for which the graph comparison function is optimal with respect to the optimal image graph determined for said reference graph.

However, despite recent engineering progress there is a need for a further reduction in the time required for analyzing image data, for example, video sequences, in the context of object identification with a higher reliability of the identification result as compared to the art.

DESCRIPTION OF THE INVENTION

The invention provides a computer-implemented method of identifying a physical object (from an image object, i.e., an object in an image), comprising the steps of:

providing image data comprising an image object representing a physical object (for example, a person or a face of a person, an animal or a vehicle);

analyzing the image data to extract identification data (that might comprise biometric data, if the physical object is a living being) for the image object;

providing supplementary data (different from the identification data) associated with a particular physical object; and determining whether the image object corresponds to the particular physical object (reference physical object) based on the identification data and supplementary data.

The image data can be provided as one or more video frames of recorded video data. Providing the image data may comprises the recording of the video data, in particular, in real time. The analyzing of the image data may also be performed in real time. In this case, actions (as issuance of an alarm or a request for adjudication) can be taken in real time in response to the result of determining whether the image object corresponds to the particular physical object. Alternatively, the vide data may not be recorded in real time and/or the analysis of the image data may not be performed in real time but rather in response to a particular event having happened.

The image object, i.e., the object comprised in the image (data), corresponds to a real world (physical) object and in order to identify a particular physical object it has to be determined whether or not the image object corresponds to the particular physical object. It goes without saying that the physical object represented by the image object may be different from the particular physical object.

According to the invention, when determining whether or not the image object corresponds to the physical object supplementary data (that may be retrieved from a database) associated with the particular physical object is used. Contrary, in the art an image is analyzed and merely based on a matching result of matching the analyzed image data with reference object data it is determined whether or not the image object corresponds to a particular physical object. In other words, the identification procedure of the art is supplemented by usage of supplementary data associated, in particular, in a temporal-spatial manner, with the particular physical object. Thereby, speed, accuracy and reliability of the identification process can significantly be enhanced.

The supplementary data represents another identification data used for object identification that is different from the identification data obtained by analysis of the image data but is associated with a physical object in the real word. For example, the supplementary data represents another physical object that is different from the particular physical object and may be associated with the particular physical object in that it has previously been recognized in the context of recognition of the particular physical object. The supplementary data may be pre-stored in a database and comprise a data representation of the other physical object. The inventive method may comprise recognizing another image object in the analyzed image data the other image object representing the other physical object (see also detailed description below).

The particular physical object may be a particular person and the other physical object may be another person known to frequently accompany the particular person. Images of the particular person may have been recorded in the past on which the particular person is shown accompanied by another person, for example, a mother is accompanied by her child. This information is made available when determining whether the image object corresponds to the particular physical object based on the identification data and supplementary data. If the person (for example, the mother) shown in the image data is accompanied by the other person (for example, the child), it is more probable that the image object represents this person than if the person (for example, the mother) shown in the image data is not accompanied by the other person (for example, the child). This information can be used for the identification of the physical object thereby accelerating the overall identification procedure and allowing for more reliable identification results.

The particular physical object may a person and the other physical object associated therewith may be a vehicle or a mobile device (for example, a notebook, smartphone or PDA, etc.) that may be connectable to the Internet (or any other network, for example, an intranet). The other physical object may be a bag, a cap, a helmet, a shoe, a garment, a weapon, etc. For example, recognition can be performed based on a selfie with a weapon or a cap posted in social media. The particular person may be known in the past having carried the mobile device and if the person shown in the image data carries the mobile device, it is more probable that the image object represents this person than if the person shown in the image data does not carry the mobile device. Knowledge of the presence of the mobile device in different situations at previous times may either be derived from the analysis of image data or from other sources. For example, identification codes (numbers) of the mobile device (for instance, International Mobile Station Equipment Identity (IMEIs) for cell phones or any other GSM or UMTS terminals may be detected and used as being comprised in the supplementary data. In general, providing identification data for another physical object associated with the particular physical object may be comprised in the step of providing supplementary data of the inventive method of identifying a physical object. Particularly, in the image data under consideration it may have to be determined whether the other object is also present.

Any other objects known to be often or usually carried by a person or to be otherwise present in the proximity of a person may be used as supplementary data when determining whether the image object corresponds to the particular physical object according to the inventive method.

The supplementary data may be provided by (or retrieved from) social media or any device connected to the Internet (for example, a smartphone). Particularly, social media (for example, Facebook, Twitter, etc.) may be screened with reference to a particular person. The supplementary data may comprise information on the particular person retrieved from social media. When determining from an image whether or not a particular person is present at a particular location at a particular time it might be helpful to consider (as part of the mentioned supplementary data) information given by or about that person in social media.

In embodiments of the inventive method the determining whether the image object corresponds to the particular physical object may comprise determining a probability measure of a matching of the image object with the particular physical object and determining that the image object corresponds to the particular physical object, if the determined probability measure exceeds a predetermined threshold. In particular, the determining of the probability measure may comprise matching the image object with the particular physical object by comparing the identification data with pre-stored data (reference data) of the particular physical object (reference physical object). It is very convenient to use some probability approach when identifying an object. In particular, according to an embodiment the probability measure may be determined based on the supplementary data in addition to the identification data extracted from the image data in order to improve the reliability of the identification result.

According to another embodiment, the step of determining whether the image object corresponds to the particular physical object comprises determining a candidate object without using the supplementary data and verifying that the candidate object corresponds to the particular physical object by means of the supplementary data. For example, based on a face recognition method a face/person of an image is determined to be a face/image known from a database with some probability. Thus, the candidate object is determined if the probability exceeds some predefined threshold. The question whether or not the candidate object (person) is really the person represented in the database is answered by means of the supplementary data. The determining of the candidate object may comprise determining that the image object corresponds to the candidate object with a first probability exceeding a first probability threshold and the verifying that the candidate object is the particular physical object may comprise determining that the candidate object corresponds to the particular physical object with a second probability exceeding a second probability threshold that is higher than the first probability threshold and/or the first probability based on the supplementary data.

In the above-described embodiments the analyzing of the image data may comprise employing a face recognition procedure, in particular, comprising extracting jets from the image data. Here, the procedure taught in U.S. Pat. No. 7,113,641 B1 may be applied.

In the above-described embodiments, furthermore, a portion of the image data may be displayed on a screen for further survey, analysis by a human being etc., based on the result of the step of determining whether the image object corresponds to the particular physical object.

Furthermore, it is provided a computer program product, comprising one or more computer readable media having computer-executable instructions for performing the steps of the computer-implemented method according to one of the preceding claims.

Additional features and advantages of the present invention will be described with reference to the drawings. In the description, reference is made to the accompanying figures that are meant to illustrate preferred embodiments of the invention. It is understood that such embodiments do not represent the full scope of the invention.

FIG. 2 illustrates elements of a system wherein the inventive method of object identification can be implemented.

Figure 1:
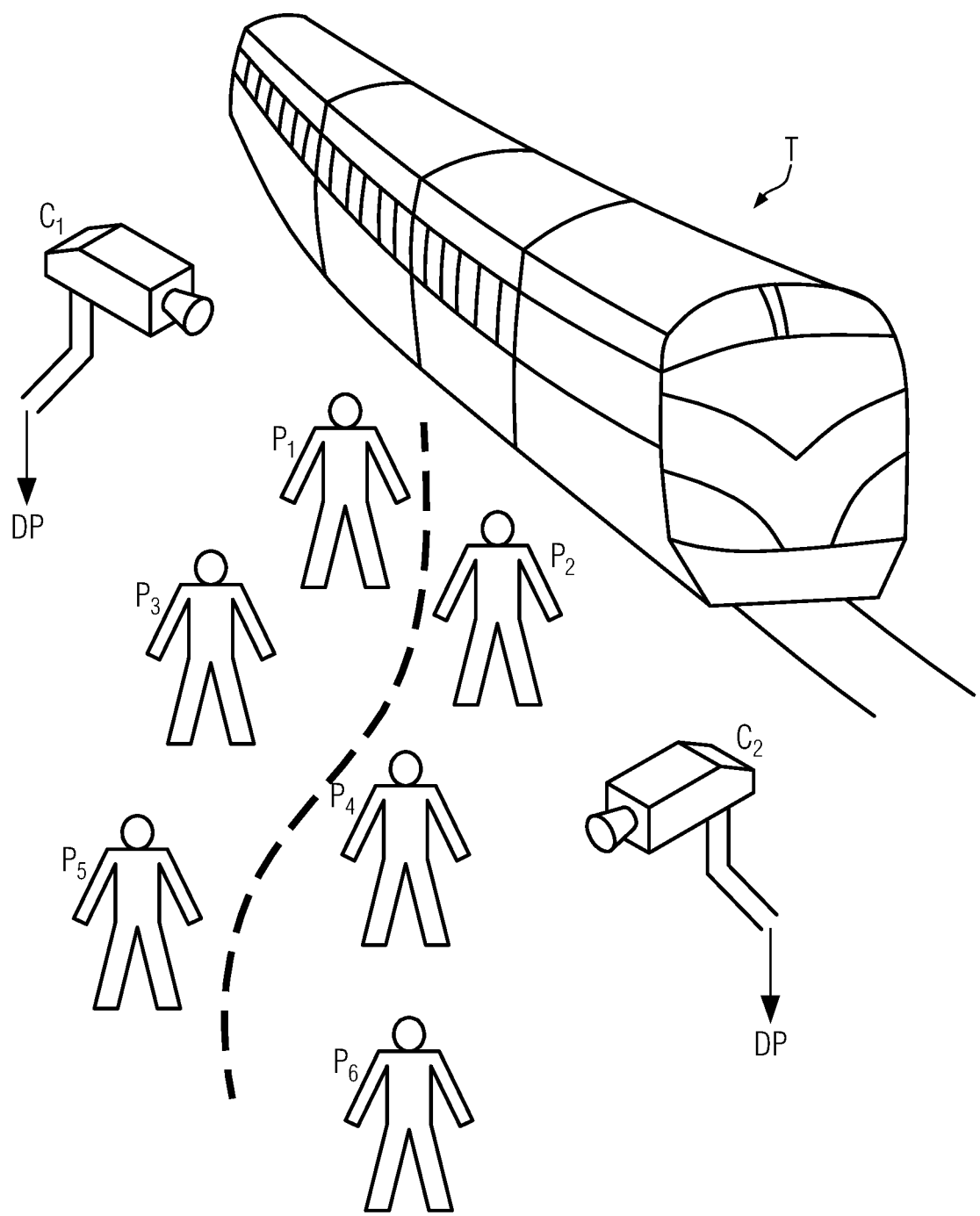
FIG. 1 illustrates a typical situation wherein the herein described inventive method of object identification can advantageously be used.

FIG. 3 displays a flow diagram illustrating an embodiment of a method of object identification according to an embodiment of the present invention.

FIG. 4 displays a flow diagram illustrating an embodiment of a method of object identification according to another embodiment of the present invention.

Various illustrative embodiments of the disclosure are described below. In the interest of clarity, not all features of an actual implementation are described in this specification. It will of course be appreciated that in the development of any such an actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The following embodiments are described in sufficient detail to enable those skilled in the art to make use of the disclosure. It is to be understood that other embodiments would be evident, based on the present disclosure, and that system, structure, process or mechanical changes may be made without departing from the scope of the present disclosure. In the following description, numeral-specific details are given to provide a thorough understanding of the disclosure. However, it would be apparent that the embodiments of the disclosure may be practiced without the specific details. In order to avoid obscuring the present disclosure, some well-known circuits, system configurations, structure configurations and process steps are not disclosed in detail.

The present invention relates to the identification of an object, in particular, a person, in image data. The image data is analyzed to obtain identification data that can be matched with reference data. Herein, image data may represent a still image or one or more vide to frames, for example. Supplementary data is provided that is used in the process of determining whether an image object comprised in the image data corresponds to a particular physical object (reference physical object).

Consider a situation as depicted in FIG. 1. A train T arrives at a station and a huge number of persons $P_1, \ldots, P_n$ leaves the train. The situation is surveyed by cameras $C_1$ and $C_2$ that are connected by data links to a data processing station DP. Identification of a particular subject among the crowd of persons $P_1, \ldots, P_n$ based on the analysis of video data recorded by the cameras $C_1$ and $C_2$ is tremendous task. Video frames have to be analyzed to obtain identification data. The analysis can be performed by any method known in the art (see, for example, U.S. Pat. No. 7,113,641 B1). The identification data has to be compared with some reference data provided by a database. In order to accelerate the identification procedure and to arrive at reliable results, according to the invention, supplementary data is used.

As illustrated in FIG. 2 the data processing station DP receives video streams from a number of surveillance cameras, for example, three surveillance cameras $C_1$, $C_2$ and $C_3$. The data processing station DP has access to a first database $DB_1$. The first data base $DB_1$ may include for each person of a watch list of persons an image of the person, in particular an image of the face of the person, obtained for example during an investigation regarding that person. By using computer-implemented face detection and face analysing tools or algorithms, characteristic facial features may have been extracted and pre-stored in the database for matching purposes. The watch list may have entries of persons that are considered as potentially dangerous. Real time surveillance and screening as well as post-event analysis systems working with a watch list of known or unknown identities may trigger an event (typically an alarm or a request for adjudication) in case a certain threshold of a matching score is reached.

The data processing station DP also has access to a second database $DB_2$. The second database $DB_2$ provides supplementary data used in the process of identifying a person from video data. This pre-stored supplementary data may also have been gathered during an investigation regarding a particular person. Based on the data stored in the first and second databases $DB_1$ and $DB_2$ it is determined by the data processing station DP whether or not a person shown in one or more video frames of video streams supplied by to the surveillance cameras $C_1$, $C_2$ and $C_3$ is identical with a particular person (being an example of a reference physical object) the data of which are stored in databases $DB_1$.

In the following, a process flow of an embodiment of a method of object identification that may make use of the system illustrated in FIG. 2 is described. Video data is provided 10 by one or more video cameras, for example, cameras $C_1$ and $C_2$ shown in FIG. 1 or cameras $C_1$, $C_2$ and $C_3$ shown in FIG. 1. The video data may represent one or more of the persons $P_1, \ldots, P_n$ shown in FIG. 1. The video data is analyzed 11, for example, by the data processing station DP shown in FIG. 2. The analysis provides identification data for a person. The analysis may be performed based on a face recognition procedure known in the art. The face recognition procedure may be based on a jet approach.

The identification data can be used for matching with reference data, for example, stored in the first database $DB_1$ shown in FIG. 2.

However, according to the shown embodiment identification of a person or another object from video data is not performed on the basis of the identification and reference data alone. Rather, supplementary data is provided 12, for example, retrieved from the second database $DB_2$ shown in FIG. 2. Based on the analysis of the video data and the supplementary data the person (or other object) is identified 13.

The supplementary data provide additional information on a reference physical object (person). This additional information may be provided by social media. For example, in an ongoing investigation a particular person is under survey and the social media posts, blogs, etc. of the person are monitored. The results of the monitoring process are stored and made available as supplementary data. Consider, for instance, a particular person has posted via social media that he will travel to Munich by train. In a situation as shown in FIG. 1 video frames recorded by cameras $C_1$, $C_2$ installed in the main train station of Munich include an image object that after analysis of the image data may be suspect to correspond to the person. Given that this person has announced to travel to Munich by train the probability that the image object represents that person is rather high and, therefore, the person may be identified from the video frames.

According, to another example, the supplementary data give information that a particular suspect is usually accompanied by a particular other person. Reference biometric data of both the particular suspect and the usually accompanying particular other person may be to stored in databases. For example, biometric data of the particular suspect may be stored in database $DB_1$ and biometric data of the usually accompanying particular other person may be stored in the second database $DB_2$ shown in FIG. 2. Moreover, the second database $DB_2$ provides the information that the particular suspect is usually accompanied by the usually accompanying particular other person.

In the situation shown in FIG. 1 video frames recorded by cameras $C_1$, $C_2$ may include an image object that based on an analysis of the image data is determined to represent the particular suspect with some probability. The determination procedure may include matching of features obtained by face recognition with reference features pre-stored for the particular suspect. In addition, based on supplementary data indicating that the particular suspect is usually accompanied by a usually accompanying particular other person the video frames are analyzed with respect to recognition of the usually accompanying particular other person. If the usually accompanying particular other person is also recognized, the image object is determined to represent the particular suspect with a significant higher probability than the previously mentioned some probability. Thus, identification of the particular suspect can quickly be achieved with a high degree of reliability.

According to another example, a particular person is known to carry particular smartphone. For example, during previous investigation the IMEI of the smartphone of the particular person has be determined and stored as identification data of the smartphone. The identification data of the smartphone may be comprised in supplementary data stored in a database, for example, in the second database $DB_2$ shown in FIG. 2. In the situation shown in FIG. 1 video frames recorded by cameras $C_1$, $C_2$ may include an image object that based on an analysis of the image data is determined to represent the particular person with some probability. The determination may be made by the data processing station DP shown in FIG. 2.

In addition, the data processing station DP may retrieve supplementary data from the second database $DB_2$ shown in FIG. 2. This supplementary data may include the IMEI of the smartphone of the particular person. If the smartphone of the particular person, for example, in the situation shown in FIG. 1, is registered in the actual local cell, for example, the IMEI of the smartphone can be determined. The IMEI may be determined when the particular person is actually using its smartphone. The thus determined IMEI may be compared to the IMEI provided in the supplementary data and, if the IMEIs match each other, the person in the video frames is identified as the particular person with a probability much higher than the mentioned some probability. Thus, identification of the particular suspect can quickly be achieved with a high degree of reliability.

A process flow of a method of object identification according to another embodiment is illustrated in FIG. 4. In step 20 identification data is extracted from image data. The extraction may be performed by an conventional face recognition method in the case that the object to be identified is a person. The image data may be provided by one or more video cameras, for example, cameras $C_1$ and $C_2$ shown in FIG. 1 or cameras $C_1$, $C_2$ and $C_3$ shown in FIG. 2.

Based on identification data achieved by the analysis of the image data a candidate object can be determined 21. The candidate object represents a physical object, like a real person, and determination of a candidate object may include matching of an image object with objects of a database representing physical objects and determining probability values for the matching. For example, if an image object corresponds to a reference object (corresponding to a reference physical object in the real world) stored in a database with a first probability higher than a first probability threshold, the reference object is determined to be a candidate object. More than one candidate object may be determined, in principle.

Supplementary data related to the reference physical object is provided in step 22. The supplementary data may be provided in accordance with one of the examples described above with reference to FIG. 3. Based on the provided supplementary data associated with a particular physical object the candidate object can be verified 23, i.e., it can be determined that the image object corresponds to the reference object (to a high degree of probability) and, thereby, the reference physical object corresponding to the reference object, with a second probability higher than the first probability and/or the first probability threshold. By verifying the candidate object the object identification is achieved in this example in a reliable and speedy manner.

The invention claimed is:

1. A computer-implemented method of identifying a physical object executed by one or more processing devices and, comprising the steps of:
   providing image data comprising an image object representing a physical object;
   analyzing the image data to extract identification data for the image object;
   providing supplementary data associated with a particular physical object;
   determining whether the image object corresponds to the particular physical object based on the identification data and supplementary data;
   wherein determining whether the image object corresponds to the particular physical object comprises determining a candidate object without using the supplementary data and verifying that the candidate object corresponds to the particular physical object using the supplementary data; and wherein
   a) determining the candidate object comprises determining that the image object corresponds to the candidate object with a first probability exceeding a first probability threshold; and
   b) verifying that the candidate object corresponds to the particular physical object comprises determining based on the supplementary data that the candidate object corresponds to the particular physical object with a second probability exceeding a second probability threshold that is higher than at least one selected from the group comprising the first probability and the first probability threshold.

2. The computer-implemented method according to claim 1, wherein providing the image data comprises recording video data and providing at least one video frame of the recorded video data.

3. The computer-implemented method according to claim 2, wherein analyzing the image data and recording the video data are performed in real time.

4. The computer-implemented method according to claim 1, wherein the particular physical object is a person or a face of a person.

5. The computer-implemented method according to claim 1, wherein providing the supplementary data comprises providing data from social media or a device connected to the Internet or another network as an intranet.

6. The computer-implemented method according to claim 1, wherein providing the supplementary data comprises providing another identification data for another physical object associated with the particular physical object.

7. The computer-implemented method according to claim 6, wherein the other physical object associated with the particular physical object is one of a person, a vehicle, a bag, a cap, a helmet, a shoe, a garment, a weapon and a mobile device.

8. The computer-implemented method according to claim 6, further comprising recognizing the other physical object in the analyzed image data.

9. The computer-implemented method according to claim 1, wherein determining whether the image object corresponds to the particular physical object comprises determining a probability measure of a matching of the image object with the particular physical object and further comprising determining that the image object corresponds to the particular physical object, if the determined probability measure exceeds a predetermined threshold.

10. The computer-implemented method according claim 9, wherein determining the probability measure comprises matching the image object with the particular physical object by comparing the identification data with pre-stored data of the particular physical object.

11. The computer-implemented method according to claim 1, wherein analyzing the image data comprises employing a face recognition procedure comprising extracting jets from the image data.

12. The computer-implemented method according to claim 1, further comprising displaying a portion of the image data based on the result of the step of determining whether the image object corresponds to the particular physical object.

13. The computer-implemented method according to claim 2, wherein the particular physical object is a person or a face of a person.

14. The computer-implemented method according to claim 3, wherein the particular physical object is a person or a face of a person.

15. The computer-implemented method according to claim 1, wherein providing the supplementary data comprises at least one selected from the group of (i) providing data from social media or a device connected to the Internet or another network as an intranet and (ii) providing another identification data for another physical object associated with the particular physical object.

16. The computer-implemented method according to claim 2, wherein providing the supplementary data comprises at least one selected from the group of (i) providing data from social media or a device connected to the Internet or another network as an intranet and (ii) providing another identification data for another physical object associated with the particular physical object.

17. The computer-implemented method according to claim 3, wherein providing the supplementary data comprises at least one selected from the group of (i) providing data from social media or a device connected to the Internet or another network as an intranet and (ii) providing another identification data for another physical object associated with the particular physical object.

18. A computer program product, comprising one or more non-transitory computer readable media having computer-executable instructions for performing the steps of a computer-implemented method comprising:
  providing image data comprising an image object representing a physical object;
  analyzing the image data to extract identification data for the image object;
  providing supplementary data associated with a particular physical object;
  determining whether the image object corresponds to the particular physical object based on the identification data and supplementary data;
  wherein determining whether the image object corresponds to the particular physical object comprises determining a candidate object without using the supplementary data and verifying that the candidate object corresponds to the particular physical object using the supplementary data; and wherein
    a) determining the candidate object comprises determining that the image object corresponds to the candidate object with a first probability exceeding a first probability threshold; and
    b) verifying that the candidate object corresponds to the particular physical object comprises determining based on the supplementary data that the candidate object corresponds to the particular physical object with a second probability exceeding a second probability threshold that is higher than at least one selected from the group comprising the first probability and the first probability threshold.

* * * * *